(12) United States Patent
Jackowski et al.

(10) Patent No.: US 10,279,918 B2
(45) Date of Patent: May 7, 2019

(54) METHODS AND APPARATUS TO CONTROL THRUST RAMPING OF AN AIRCRAFT ENGINE

(71) Applicant: The Boeing Company, Chicago, IL (US)

(72) Inventors: Jason J. Jackowski, Everett, WA (US); Kent E. Karnofski, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 117 days.

(21) Appl. No.: 15/253,306

(22) Filed: Aug. 31, 2016

(65) Prior Publication Data

US 2018/0057184 A1 Mar. 1, 2018

(51) Int. Cl.
| | | |
|---|---|---|
| *B64D 31/06* | (2006.01) | |
| *B64D 43/00* | (2006.01) | |
| *F02C 9/00* | (2006.01) | |
| *F02C 9/28* | (2006.01) | |

(52) U.S. Cl.
CPC ............. *B64D 31/06* (2013.01); *B64D 43/00* (2013.01); *F02C 9/00* (2013.01); *F02C 9/28* (2013.01); *F05D 2270/051* (2013.01)

(58) Field of Classification Search
CPC ................................ B64D 31/06; B64D 43/00
USPC ........................................................ 701/14
See application file for complete search history.

(56) References Cited

U.S. PATENT DOCUMENTS

| | | | | |
|---|---|---|---|---|
| 3,447,372 A | * | 6/1969 | Fisher | G01K 1/024 340/626 |
| 3,568,954 A | * | 3/1971 | McCorkle, Jr. | F41G 7/36 244/3.2 |
| 4,182,119 A | * | 1/1980 | Hurley | F01D 17/085 60/226.1 |
| 4,763,266 A | | 8/1988 | Schultz et al. | |
| 6,486,799 B1 | * | 11/2002 | Still | G01C 23/005 340/961 |
| 8,615,335 B2 | * | 12/2013 | Couey | F02C 9/28 244/188 |
| 9,758,257 B1 | * | 9/2017 | Frolov | B64D 43/02 |
| 2017/0293307 A1 | * | 10/2017 | Frolov | B64D 43/02 |

OTHER PUBLICATIONS

European Patent Office, "Extended Search Report," issued in connection with European Patent Application No. 17176788.2, dated Dec. 7, 2017, 6 pages.

* cited by examiner

*Primary Examiner* — Anne M Antonucci
*Assistant Examiner* — James E Stroud
(74) *Attorney, Agent, or Firm* — Hanley, Flight & Zimmerman, LLC

(57) ABSTRACT

Methods and apparatus to control thrust ramping of an aircraft engine are disclosed. An example thrust control system includes a sensor to measure a crosswind speed and a thrust manager to compare the measured crosswind speed to a crosswind threshold range. The thrust manager activates a partial thrust ramping schedule during takeoff when the measured crosswind speed is within the crosswind threshold range. The partial thrust ramping schedule is selected from a plurality of thrust ramping schedules.

22 Claims, 6 Drawing Sheets

METHODS AND APPARATUS TO CONTROL THRUST RAMPING OF AN AIRCRAFT ENGINE

FIELD OF THE DISCLOSURE

This disclosure relates generally to aircrafts and, more particularly, to methods and apparatus to control thrust ramping of an aircraft engine.

BACKGROUND

Engine thrust may be limited or controlled at low ground speed during the initial part of takeoff to reduce engine stress. For example, limiting available thrust during takeoff when certain crosswind conditions are present reduces wear on aircraft engines, thereby reducing maintenance costs and/or noise.

SUMMARY

Figure 1:
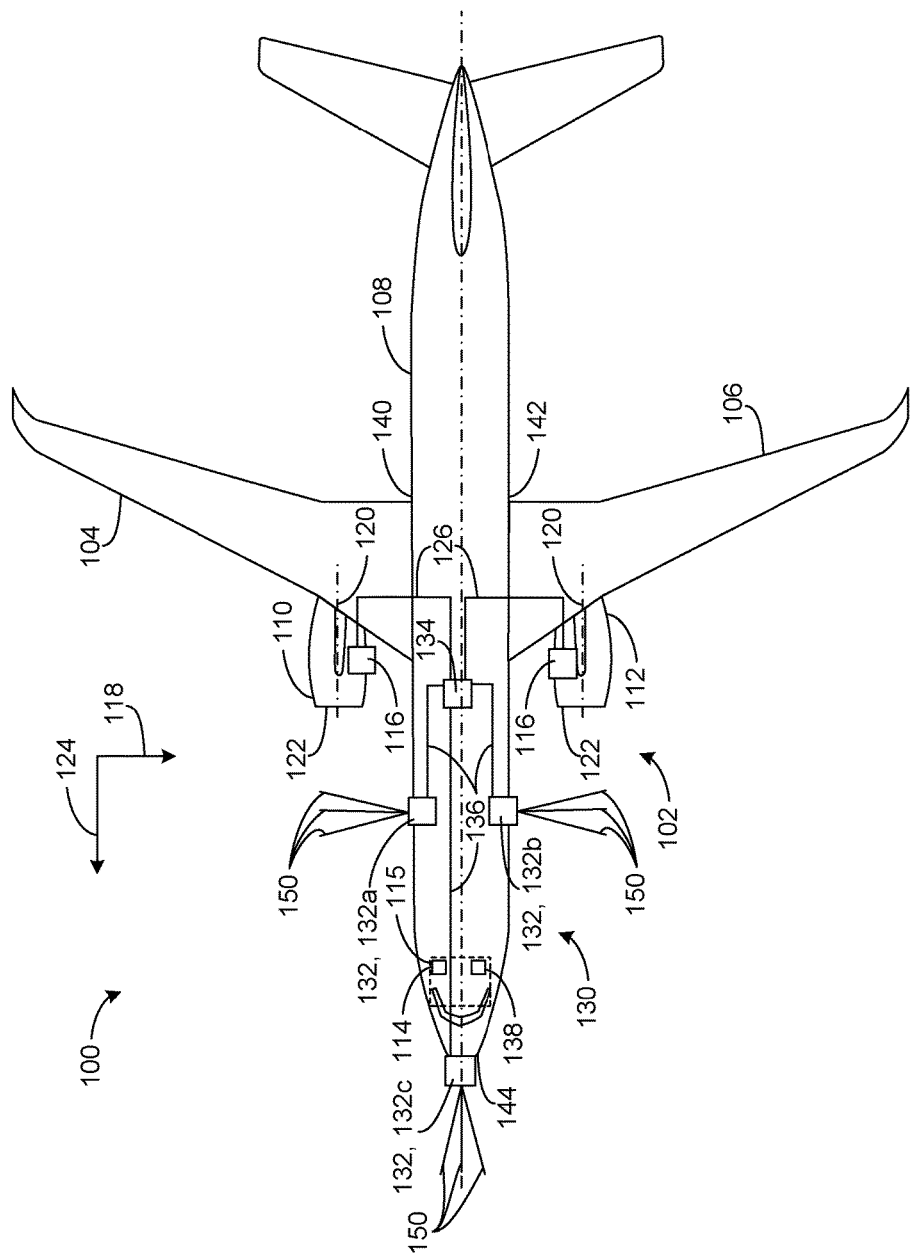
FIG. 1 is an example aircraft implemented with an example thrust ramping system in accordance with the teachings of this disclosure.

An example thrust control system includes a sensor to measure a crosswind speed and a thrust manager to compare the measured crosswind speed to a crosswind threshold range. The thrust manager to activate a partial thrust ramping schedule during takeoff when the measured crosswind speed is within the crosswind threshold range. The partial thrust ramping schedule is selected from a plurality of thrust ramping schedules.

An example method includes measuring a crosswind speed when the aircraft is taxiing; comparing the measured crosswind speed to a crosswind threshold range; and activating a partial thrust ramping schedule during takeoff based on the measured crosswind speed when the measured crosswind speed is within the crosswind threshold range.

An example tangible computer-readable medium includes instructions that, when executed, cause a machine to measure a crosswind speed; compare the measured crosswind speed to a crosswind threshold range; and activate a partial thrust ramping schedule during takeoff based on the measured crosswind speed when the measured crosswind speed is within the crosswind threshold range.

DETAILED DESCRIPTION

Adverse aerodynamic conditions at an inlet of an aircraft engine affect performance of the engine. During takeoff conditions, for example, crosswinds may cause airflow through an inlet of an engine to separate along an inner surface of the inlet as the airflow moves toward a rotor or fan of the engine. Such airflow separation may provide poor aerodynamics with respect to fan blades within the engine when the rotor or fan accelerates too rapidly during adverse aerodynamic conditions. For example, adverse aerodynamic conditions may impart vibrational forces on the fan blades that may wear and/or damage the fan blades, thereby resulting in increased replacement or maintenance of the blades. Thus, due to crosswind conditions during takeoff, an acceleration rate of the rotor or fan blade may affect the maintenance schedule required for an engine. Increased maintenance increases costs and/or removes the aircraft from an available fleet.

To reduce or prevent damage to the aircraft engines due to crosswind conditions during takeoff, engine power or thrust may be limited (e.g., less than full available power) and/or adjusted (e.g., progressively adjusted) gradually to control a rate of acceleration of the rotor or fan until an aircraft speed (e.g., a forward speed of airflow parallel to a longitudinal axis of the aircraft engine) is such that adverse aerodynamics at an inlet of an engine no longer occur. For example, when airflow (e.g., relative velocity of airflow) into the inlet of the engine reaches a certain speed (e.g., when an aircraft reaches a relative velocity threshold suitable for liftoff), crosswinds of an airflow orthogonal to the inlet of the aircraft engine are negligible relative to the airflow parallel to the inlet of the aircraft engine. In other words, when the aircraft generates sufficient airspeed, an airflow vector flowing into the inlet parallel to a longitudinal axis of the engine is significantly greater than the airflow vector of the crosswind that is non-parallel (e.g., orthogonal) relative to the longitudinal axis of the aircraft inlet. Thus, the effects of crosswind become negligible and no longer impact engine performance and/or maintenance of the aircraft engine when the aircraft reaches a specific airspeed.

To reduce engine wear due to adverse crosswind conditions during a portion of a takeoff phase, some example aircraft employ thrust ramping systems to limit engine thrust output. For example, thrust ramping restricts a rate of acceleration of the rotor or fan when the aircraft is moving at relatively low ground speeds. For example, thrust ramping systems can cause an electronic engine controller to compensate for high stress loads on the fan blades due to crosswinds and low ground speeds by slowly increasing thrust until a threshold airspeed value is reached at which crosswind no longer impacts aerodynamic performance of an engine. Such airspeed threshold is dependent on performance characteristics of the engine (e.g., an inlet of a nacelle).

However, some thrust ramping systems are active for all takeoffs, regardless of whether crosswind conditions require thrust limiting. For example, thrust limits may be imposed when crosswind conditions (e.g., crosswinds of 10 knots or less) do not impact engine performance (e.g., allow use of full available thrust). Additionally, some thrust ramping systems apply the same thrust limit for all crosswind conditions. For example, some thrust limit systems may impose the same thrust limit value when crosswind conditions are 12 knots or 30 knots.

Although thrust ramping during takeoff reduces strain on an aircraft engine during high crosswind conditions, limiting thrust during takeoff affects takeoff speed and aircraft weight. For example, a heavier aircraft weight needs greater speed for liftoff. Thus, limiting thrust during takeoff may require additional runway length to reach proper takeoff speeds due to imposed thrust limits for duration of a takeoff phase. Thus, thrust ramping systems may impose a field length penalty and/or a payload penalty. For example, thrust ramping systems can impose a small field length penalty of 120 feet at a runway altitude of 14,000 feet. As a result, aircraft equipped with thrust ramping systems may require longer runways and/or may be required to carry lighter loads (e.g., loads that are less than a maximum allowable load). Thus, some thrust ramping systems may cause an aircraft to operate at less efficiency by limiting loads during crosswind conditions that may not require thrust limits or ramping during takeoff.

The example methods and apparatus disclosed herein selectively activate thrust ramping based on takeoff conditions (e.g., crosswind conditions). In particular, unlike some thrust ramping systems, the example methods and apparatus disclosed herein employ thrust control or ramping based on a measured crosswind determined during taxiing. For example, an example method disclosed herein includes measuring a crosswind speed during taxiing (e.g., when the aircraft is stationary) and compares the measured crosswind speed to a crosswind threshold range. In some examples, the methods and apparatus disclosed herein impose thrust limits and/or provide thrust ramping when a crosswind speed is greater than a crosswind threshold. Thus, the example methods and apparatus disclosed herein may not apply thrust limits and/or thrust ramping when the measured crosswind is less than a crosswind threshold. In this manner, an aircraft may employ full available thrust during takeoffs with non-adverse crosswind conditions (e.g., crosswind conditions that do not require thrust ramping). In some such instances, aircraft takeoff performance can be realized when thrust ramping is not activated. For example, without thrust ramping, an aircraft may takeoff using a shorter runway length and/or may takeoff with a heavier payload (e.g., cargo).

Additionally, the example methods and apparatus disclosed herein employ a plurality of different thrust ramping schedules corresponding to different measured crosswind conditions. The example methods and apparatus disclosed herein employ partial thrust ramping when a measured crosswind speed is within a crosswind threshold range, and employ full thrust ramping when the measured crosswind speed exceeds an upper limit of the crosswind threshold range.

In some examples, partial thrust ramping provides a scaled or optimized thrust ramping for a measured crosswind speed. Thus, when partial thrust ramping is activated, a thrust ramping schedule based on the measured crosswind speed. For example, a first thrust ramping schedule is selected when the measured crosswind speed is a first value within the crosswind threshold range and a second thrust ramping schedule when the measured crosswind speed is a second value within the crosswind threshold range. For example, a thrust output limit of the first thrust ramping schedule selected based on a first measured crosswind speed may be less than the thrust output limit of a second thrust ramping schedule selected based on a second measured crosswind speed (e.g., at an upper limit of the crosswind threshold range). For example, a thrust ramping schedule associated with a measured crosswind speed of approximately 15 knots may impose an initial thrust limit of approximately 80% of available engine thrust, and a thrust ramping schedule associated with a measured crosswind speed of approximately 25 knots may impose an initial thrust limit of approximately 50% of available engine thrust. Additionally, in some examples, a rate of engine acceleration between an initial thrust limit and full thrust availability varies with different thrust ramping schedules. For example, a rate of a first thrust ramping schedule associated with relatively low crosswind speeds may be greater than a rate of a second thrust ramping schedule associated with relatively higher crosswind speeds.

Full thrust ramping schedule is selected when the measured crosswind value is greater than an upper limit of the crosswind threshold range. For example, the same full thrust ramping schedule applies for all measured crosswind speeds that are greater than the upper limit of the crosswind threshold range. Thus, for all crosswind values greater than, for example, 30 knots, the full thrust ramping schedule is activated. The thrust ramping is deactivated when the measured crosswind speed is less than a lower limit of the crosswind threshold range. Thus, the example methods disclosed herein do not impose thrust limits during takeoff when thrust ramping is in a deactivated state.

FIG. 1 is an example aircraft 100 implemented with an example thrust ramping system 102 in accordance with the teachings of this disclosure. The aircraft 100 is an example aircraft and, thus, the example methods and apparatus disclosed herein may be implemented with other aircraft, spacecraft or vehicles without departing from the scope of this disclosure. The example aircraft 100 of the illustrated example is a commercial aircraft having a first wing 104 and a second wing 106 extending from a fuselage 108. The aircraft 100 of the illustrated example includes a first engine 110 coupled to the first wing 104 and a second engine 112 coupled to the second wing 106. Thrust outputs of the first engine 110 and the second engine 112 are commanded via a thrust lever 114 positioned in a cockpit 115 of the aircraft 100. For example, during operation, the thrust lever 114 is manipulated to command thrust outputs of the first engine 110 and the second engine 112.

To control operation (e.g., thrust output) of the first engine 110 and the second engine 112 based on a thrust command input provided by the thrust lever 114, each of the engines 110 and 112 of the illustrated example employs an electronic engine controller 116. For example, the electronic engine controller 116 determines an amount of power or thrust output that is commanded from the first engine 110 and the second engine 112 via the thrust lever 114. Additionally, the electronic engine controller 116 of the illustrated example determines or receives operating characteristic(s) (e.g., aircraft speed, angle of attack, altitude, static and/or dynamic air pressures, air speed, air density, air temperature, air pressure, engine pressure, engine temperature, etc.) to achieve the desired thrust set by the thrust lever 114. For example, the electronic engine controller 116 computes a fan speed to achieve a thrust corresponding to thrust command input provided by the thrust lever 114. Based on a power or thrust output requirement and/or operating characteristic(s), the electronic engine controllers 116 modulate fuel flow (e.g., based on a fuel-to-air ratio) to the first engine 110 and the second engine 112.

During takeoff, the aircraft 100 of the illustrated example selectively activates thrust ramping during certain crosswind condition(s). For example, the aircraft 100 of the illustrated example limits a rate of acceleration of the fan of the first engine 110 and the second engine 112 during adverse crosswind conditions that may otherwise cause damage to the fans (e.g., the fan blades) of the engines 110 and 112 when the ground speed of the aircraft 100 is relatively low. For example, during relatively low ground speeds, high crosswinds 118 orthogonal to longitudinal axes 120 of inlets 122 of the first engine 110 and the second engine 112 may cause flow separation along an inner surface of the inlets 122. Such flow separation may cause turbulent flow, which can cause damage to the fan blades of the first engine 110 and/or the second engine 112 if a rate of acceleration of the engines 110 and 112 increases too rapidly. As airspeed 124 of the aircraft 100 increases (e.g., in forward direction parallel to the longitudinal axes 120), the adverse crosswind conditions no longer affect a pattern of the airflow into the inlet 122.

To selectively limit the rate of acceleration of the first engine 110 and the second engine 112, the example aircraft 100 of the illustrated example employs the thrust ramping system 102. More specifically, the example thrust ramping system 102 of the illustrated example employs thrust output limits to control a rate of acceleration of the first engine 110 and the second engine 112 when the thrust ramping system 102 detects certain operating condition(s). In some examples, the thrust ramping system 102 of the illustrated example provides on-demand thrust ramping. For example, the thrust ramping system 102 of the illustrated example determines if thrust ramping is needed by measuring a crosswind speed when the aircraft is taxiing (e.g., prior to takeoff). For example, the thrust ramping system 102 of the illustrated example measures crosswind speeds when the aircraft 100 is stationary (e.g., an initial crosswind speed). For example, when the aircraft 100 is stationary, a ground speed of the aircraft 100 is zero and a measured airflow equals a wind velocity. The wind velocity vector may be analyzed to determine a speed of the crosswind 118. Based on the crosswind speed, the thrust ramping system 102 of the illustrated example may limit thrust output during takeoff when crosswind conditions measured during taxiing are greater than a crosswind threshold (e.g., greater than 12 knots).

Additionally, as described in greater detail below, the example thrust ramping system of the illustrated example imposes different thrust ramping schedules having different thrust output limits based on the measured crosswind speed. When thrust ramping is activated to control the rate of acceleration of the fans of the first engine 110 and the second engine 112, the thrust ramping system of the illustrated example increases thrust output from an initial thrust output limit to a full available thrust output as a function of a measured airspeed of the aircraft 100 during takeoff. For example, the thrust ramping system 102 of the illustrated example limits thrust output during an initial portion of takeoff and gradually increases thrust output until full available thrust output is achieved. The thrust ramping system 102 may be communicatively coupled to the electronic engine controllers 116 via a fiber optic cable 126, a wireless system, a cellular system, and/or any other suitable communication system(s). In some examples, the thrust ramping system 102 may be formed with (e.g., embedded with) the electronic engine controllers 116.

To detect or measure air data associated with the airflow (e.g., crosswind speed, etc.) and/or the airspeed of the aircraft 100, the example thrust ramping system 102 of the illustrated example employs an optical sensor system 130 (e.g., a LIDAR sensor system). The optical sensor system 130 of the illustrated example includes a plurality of sensors 132 communicatively coupled to a thrust ramping controller 134 (e.g., a sensor signal processing unit), which analyzes signals from the sensors 132 to determine or measure (e.g., calculate) air data such as wind velocity. In other words, the optical sensor system 130 of the illustrated example detects the crosswind 118 and the airspeed 124 of the aircraft 100 (e.g., the speed of the aircraft 100 relative to the airflow). For example, when the aircraft 100 is not moving (e.g., the ground speed is zero), the sensor 132 measure wind velocity of an airflow. When the aircraft 100 moves relative to the ground, the sensors 132 measure airspeed of the aircraft 100.

In the illustrated example, each of the sensors 132 is communicatively coupled to the thrust ramping controller 134 via a cable 136 (e.g., a fiber optic cable). In some examples, the optical sensor system 130 may be employed to measure or determine other air data or operating characteristic(s) such as, for example, air pressure, altitude, air temperature, air density, and/or other operating characteristic(s). In some such examples, the operating characteristic(s) may be communicated to the electronic engine controllers 116 and/or other controller system(s) of the aircraft 100 (e.g., a full authority digital electronic controller (FADEC)). In some examples, the aircraft 100 may employ other sensors to provide the operating characteristic(s) to the electronic engine controllers 116 such as, for example, air pressure, altitude, air temperature, engine temperature, engine pressure, etc. In some examples, information or data (e.g., reference crosswind value) may be provided to the thrust ramping system 102 and/or the electronic engine controller 116 via an input/output interface 138 (e.g., a display, a touch screen, a visual indicator, etc.) positioned in the cockpit 115 of the aircraft 100.

The sensors 132 of the illustrated example include a first sensor 132a, a second sensor 132b and a third sensor 132c. More specifically, the first sensor 132a is positioned adjacent a first side 140 (e.g., a right side) of the aircraft 100, the second sensor 132b is positioned adjacent a second side 142 (e.g., a left side) of the aircraft 100 opposite the first side 140, and the third sensor 132c is positioned adjacent a nose 144 of the aircraft 100. For example, the first sensor 132a may detect or determine air data (e.g., wind velocity, relative velocity, etc.) of airflow adjacent the first engine 110 or the first side 140 of the aircraft 100, the second sensor 132b may detect or determine air data (e.g., wind velocity, relative velocity, etc.) of airflow adjacent the second engine 112 or the second side 142, and the third sensor 132c may detect or determine air data (e.g., wind velocity, relative velocity, etc.) of airflow adjacent the nose 144 of the aircraft 100. In this manner, if the crosswind 118 is moving in a direction from the second engine 112 toward the first engine 110 in the orientation of FIG. 1, the fuselage 108 may block or prevent the first sensor 132a from accurately detecting the crosswind 118. In some such instances, the second sensor 132b and/or the third sensor 132c may detect the crosswind 118 (e.g., crosswind speed). In some examples, the information provided by the first sensor 132a may be used in conjunction with information provided by the second sensor 132b and/or the third sensor 132c to detect the air data or operating characteristic(s). For example, the airflow characteristic(s) provided by each of the sensors 132 can be used to map or graph overall characteristics of an airflow relative to the aircraft 100. Although the examples shown in FIG. 1 illustrates the plurality of sensors 132, the example optical sensor system 130 disclosed herein may be implemented with only one sensor, two sensors or more than three sensors.

The example sensors 132 of the illustrated example are laser radar sensors or transceivers (e.g., LIDAR sensors). For example, each of the sensors 132 of the illustrated example includes a laser transmitter and a receiver. The sensors 132 of the illustrated example may be mounted on the fuselage 108 of the aircraft 100. In some examples, the sensors 132 may be positioned inside the fuselage 108 and positioned to emit laser energy through a window of the aircraft 100. In some examples, the sensors 132 may be mounted to an outer surface of the aircraft 100 (e.g., an aerodynamic surface of a wing and/or the first engine 110, the second engine 112 and/or the nose 144). In some examples, the sensors 132 of the illustrated example may be flush mounted relative to an outer surface (e.g., an aerodynamic surface, the fuselage, etc.) of the aircraft 100 such that the sensors 132 do not interfere, disrupt, modify and/or obstruct (e.g., a pattern or profile of) airflow moving across the outer surface (e.g., the fuselage and/or the aerodynamic surface) to which the sensors 132 are mounted. In some examples, one or more covers (e.g., transparent covers) may be positioned over the laser transmitter and/or the receiver.

To measure airspeed, wind velocity, crosswind and/or other air data or characteristic(s), the optical sensor system 130 characterizes or analyzes a volume of air and/or an air cloud (e.g., air particles, air molecules, liquid droplets, etc.). To characterize or analyze the air volume or the air cloud, the example sensors 132 generate or emit a laser beam or laser energy (e.g., radiation, one or more wavelengths, etc.) from, for example, a transmitter. For example, to measure a three-dimensional airflow velocity vector (e.g., wind velocity vector), each of the sensors 132 (e.g., a transmitter of the sensor) emits three laser beams 150 (e.g., orthogonal to the sensor and/or the fuselage) to measure three different velocity vectors at different predefined angles with respect to the transmitter and/or the fuselage 108. In some examples, the laser energy (e.g., continuous or pulse) that is transmitted into the atmosphere is backscattered by the air cloud (e.g., due to collisions with the air particles, air molecules, etc.) and reflected and the backscattered laser energy is received by the receivers of the sensors 132. As described in greater detail below in connection with FIG. 2, the thrust ramping controller 134 of the illustrated example converts or conditions the backscattered laser energy to generate electronic signals to measure airflow velocity.

Figure 2:
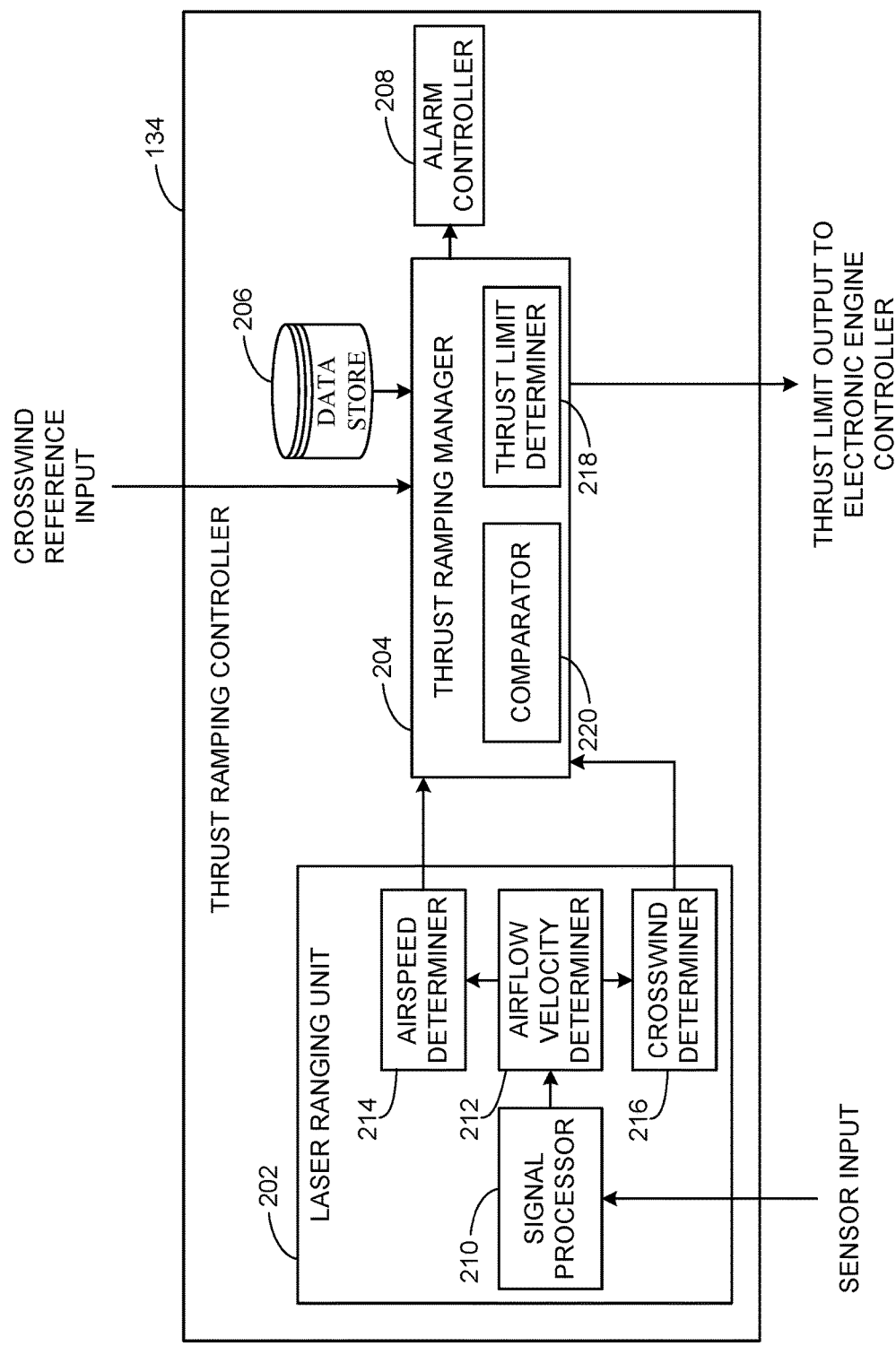
FIG. 2 is a block diagram of an example thrust ramping controller of the example thrust ramping system of FIG. 1.

FIG. 2 is a block diagram of the example thrust ramping controller 134 of FIG. 1. The example thrust ramping controller 134 of the illustrated example includes an example laser ranging unit 202, an example thrust ramping manager 204, an example data store 206 (e.g., memory), and an example alarm controller 208.

The example laser ranging unit 202 of the illustrated example analyzes the signals from the sensors 132 of FIG. 1 to determine airflow data and/or operating characteristic(s) such as, for example, the crosswind and the airspeed. The laser ranging unit 202 of the illustrated example includes an example signal processor 210 that receives the signals (e.g., the backscattered laser energy) from the receiver of the sensors 132 of FIG. 1. For example, the signals provided by the sensors 132 to the signal processor 210 may be data (e.g., raw data) relating to information provided by the backscattered laser energy. The example signal processor 210 converts such information to computer processable electronic signals that may be used to determine operating characteristic(s) and/or parameters of airflow. For example, the signal processor 210 may include, for example, an analog to digital (A/D) converter and/or an optical transducer to convert the data from the sensors 132 to the electronic signals (e.g., digital electronic signals).

The converted or conditioned backscattered laser energy (e.g., electronic signals) is then processed or analyzed to measure air data (e.g., wind velocity). To measure the velocity of the airflow, the laser ranging unit 202 of the illustrated example includes an airflow velocity determiner 212. The airflow velocity determiner 212 receives the electronic signals from the signal processor 210 and processes the electronic signals to determine a velocity of the airflow relative to the aircraft 100 using, for example, algorithms applying a Doppler velocity equation to determine the airflow or wind velocity from a frequency shift analysis. For example, the example signal processor 210 detects an amount of Doppler shift between the transmission light and the reception light to measure the velocity of airflow. In some examples, the backscattered laser energy may be processed to determine or measure air temperature, air pressure, air density, and/or other air data or characteristic(s).

To determine or measure airspeed of the aircraft 100, the laser ranging unit 202 of the illustrated example includes an airspeed determiner 214. Likewise, to determine or measure crosswind, the laser ranging unit includes a crosswind determiner 216. The airspeed determiner 214 and the crosswind determiner 216 analyze the airflow velocity vector provided by the airflow velocity determiner 212. For example, the airspeed determiner 214 determines or calculates airspeed of the aircraft 100 from an airflow velocity vector provided by the airflow velocity determiner 212 that is parallel relative to the longitudinal axes 120 of the engines 110 and/or 112. In some examples, the airspeed determiner 214 calculates or measures an airspeed based on the angle of separation of the laser beams 150 of the sensors 132 (e.g., an angle of each of the laser beams 150 relative to the transmitter of the sensors 132 and/or the fuselage 108). For example, the airflow velocity determiner 212 determines airspeed, which accounts for ground speed and wind characteristics (e.g., tailwinds, headwinds, updrafts, downdrafts, etc.) when the aircraft 100 is moving relative to the ground.

Similarly, the crosswind determiner 216 determines or calculates a crosswind value (a crosswind that is orthogonal to the longitudinal axes 120 of the engines 110 and 112) from the airflow velocity vector provided by the airflow velocity determiner 212. For example, when the airflow velocity determiner 212 measures airflow velocity when the aircraft 100 is stationary, the airflow velocity equals the wind velocity. In some examples, the thrust ramping controller 134 determines (e.g., from a ground speed sensor of a landing gear of the aircraft 100) that the aircraft 100 is taxiing or stationary. In some examples, the crosswind determiner 216, based on the angles of the sensors 132 and/or the laser beams 150, determines the orthogonal vector component of the measured airflow velocity (e.g., measured when the aircraft 100 is stationary) to determine a crosswind speed. The airspeed determiner 214 and the crosswind determiner 216 communicate the airspeed and the crosswind speed to the thrust ramping manager 204.

The thrust ramping manager 204 receives the airspeed and/or the crosswind speed from the laser ranging unit 202. Based on this received information, the thrust ramping manager 204 determines whether to activate thrust ramping (e.g., impose thrust output limits) or deactivate thrust ramping (e.g., remove thrust output limits). For example, the thrust ramping manager 204 determines whether to activate thrust ramping when the aircraft 100 is taxiing and prior to takeoff (e.g., when the aircraft 100 has a ground speed equal to zero). If the thrust ramping manager 204 activates thrust ramping, the thrust ramping manager 204 of the illustrated example communicates a thrust output limit to the electronic engine controllers 116. The electronic engine controllers 116 prevent an output thrust of the engines 110 and 112 from exceeding the thrust output limit determined by the thrust ramping manager 204. In such examples, the electronic engine controller 116 reduces a thrust command input from the thrust lever 114 that exceeds the thrust output limit. For example, the electronic engine controllers 116 set an output thrust of the engines 110 and 112 to the thrust output limit provided by the thrust ramping manager 204 when the thrust command input from the thrust lever 114 is greater than the thrust output limit provided by the thrust ramping manager 204.

If the thrust ramping manager 204 determines that thrust ramping is not needed, the thrust ramping manager 204 deactivates thrust ramping. When thrust ramping is deactivated, a thrust output limit is not imposed by the thrust ramping manager 204 to the engines 110 and 112. In such examples, the electronic engine controllers 116 control the output thrust of the engines 110 and 112 based on the thrust command input from the thrust lever 114 and/or the operating condition(s).

To determine whether to impose thrust ramping, the example thrust ramping manager 204 includes a thrust limit determiner 218, which receives the measured crosswind speed provided by the crosswind determiner 216. To determine if thrust ramping is needed, the thrust limit determiner 218 compares, via a comparator 220, the measured crosswind speed to a crosswind threshold range. The crosswind threshold range may be stored in the data store 206 (e.g., via a look-up table). The crosswind threshold range may vary based on a performance characteristic(s) of an aircraft engine. For example, aerodynamic characteristics of an inlet of a nacelle of an aircraft engine may be configured to prevent flow separation at greater crosswind speeds than aerodynamic characteristics of an inlet of another nacelle. In some such examples, an engine may have a first crosswind threshold range that may be different than a crosswind threshold range of a second engine different than the first engine. Thus, the crosswind threshold range may be different for different types of aircraft engines. For example, the crosswind threshold range may be provided by a predetermined look-up table determined in a lab during testing of a specific engine.

Based on the comparison between the crosswind speed and the crosswind threshold range, the thrust limit determiner 218 determines whether thrust ramping and/or whether full thrust ramping or a partial thrust ramping is needed. In the illustrated example, the thrust limit determiner 218 activates partial thrust ramping when the measured crosswind speed is within the crosswind threshold range, and activates the full thrust ramping when the measured crosswind speed is greater than an upper limit of the crosswind threshold range. In general, a full thrust ramping schedule may ramp acceleration of the engines 110 and 112 to full thrust output at a slower rate compared to a partial thrust ramping schedule.

Additionally, when partial thrust ramping is activated, the thrust limit determiner 218 of the illustrated example selects a thrust ramping schedule corresponding to the measured crosswind speed provided by the crosswind determiner 216. For example, the data store 206 may store a plurality of thrust ramping schedules corresponding to a plurality of crosswind conditions. Thus, the example thrust ramping manager 204 of the illustrated example applies or imposes different thrust ramping and/or different thrust output limits for different crosswind speeds that are within the crosswind threshold range. For example, a first partial thrust ramping schedule may allow greater engine acceleration rates when a crosswind speed is closer to a lower limit of the crosswind threshold range compared to a crosswind speed that is closer to an upper limit of the crosswind threshold range. In other words, the partial thrust ramping of the illustrated example provides a sliding scale thrust ramping schedule dependent on measured crosswind conditions determined by the crosswind determiner 216. Thus, for relatively low crosswind speeds in the crosswind threshold range, the thrust ramping manager 204 of the illustrated example imposes thrust ramping for a shorter duration of a takeoff phase (e.g., requiring a smaller runway length) compared to thrust ramping imposed for a relatively high crosswind speeds in the crosswind threshold range. In some examples, the plurality of thrust ramping schedules may be determined based on engine performance characteristics and may vary between different engines.

When either full thrust ramping or partial thrust ramping is active, the thrust ramping manager 204 of the illustrated example ramps the allowable thrust output (e.g., limits a rate of acceleration) of the engines 110 and 112 as a function of airspeed of the aircraft 100. A rate at which the thrust ramping manager 204 reduces the thrust limit on the engines 110 and 112 as a function of airspeed may be determined from the selected thrust ramping schedule retrieved from the data store 206 (e.g., via a look-up table).

A selected thrust ramping schedule based on a crosswind speed may include adjustments (e.g., decreases) to thrust output limits as the airspeed increases. For example, the thrust ramping manager 204 of the illustrated example progressively reduces the restriction of engine power (e.g., a thrust limit) from an initial thrust limit imposed when the airspeed is zero to full available thrust (e.g., a zero thrust restriction) when the airspeed is such that adverse aerodynamics at the inlet 122 of the first engine 110 and the second engine 112 due to crosswinds no longer occurs. In other words, the thrust ramping manager 204 of the illustrated example progressively adjusts (e.g., reduces) a thrust output limit based on airspeed of the aircraft 100 as the aircraft 100 moves from a taxiing position (e.g., a stationary position with a ground speed of zero) to liftoff (e.g., when a takeoff speed is sufficient for liftoff). The rate of the thrust reduction as a function of airspeed may be linear, exponentially, continuously, gradually, stepped and/or may have any other pattern. In addition, a rate of the thrust reduction as a function of airspeed may vary depending on a selected thrust ramping schedule. For example, a rate of a thrust reduction may be greater for thrust ramping schedules associated with crosswind speeds that are closer to the lower limit of the crosswind threshold range compared to a rate of thrust reduction of thrust ramping schedules associated with crosswind speeds that are closer to the upper limit of the crosswind threshold range.

In some examples, the thrust limit determiner 218 of the illustrated example compares a crosswind reference input provided by the input/output interface 138 and the crosswind speed provided by the crosswind determiner 216. The thrust ramping manager 204 commands the alarm controller 208 to initiate an alarm in the cockpit 115 when the crosswind reference input is less than the measured crosswind speed provided by the crosswind determiner 216. In some examples, a warning initiated by the alarm controller 208 alerts a pilot to reassess a payload of the aircraft 100.

The example thrust ramping system 102 and/or the thrust ramping controller 134 of the illustrated example enable aircraft to have more payload when crosswind conditions do not require thrust ramping. For example, a maximum payload of the aircraft 100 is determined based on takeoff optimization that includes consideration of the reference crosswind value, a runway length, air pressure, air temperature, altitude, etc. For example, prior to loading an aircraft, a traffic control tower provides the reference crosswind value to a pilot, who inputs the reference crosswind via the input/output interface 138. Based on the reference crosswind and other parameters noted above, the pilot determines a maximum load for takeoff optimization based on airline and/or government agency safety standards. In some examples, if the reference crosswind value is less than a lower limit of a crosswind threshold range associated with the aircraft 100, the aircraft 100 of the illustrated example may be loaded to a weight that does not account for runway penalty associated with known thrust ramping systems. However, other aircraft implemented with known thrust ramping systems require inclusion of thrust ramping factor when determining takeoff optimization, which reduces the maximum allowable payload of the aircraft. Additionally, the example thrust ramping system 102 and/or the thrust ramping controller 134 of the illustrated example improve takeoff optimization performance by activating partial thrust ramping during certain crosswind conditions. In this manner, less runway and/or weight penalty may be incurred by the aircraft 100.

While an example manner of implementing the example thrust ramping controller 134 of FIG. 1 is illustrated in FIG. 2, one or more of the elements, processes and/or devices illustrated in FIG. 2 may be combined, divided, re-arranged, omitted, eliminated and/or implemented in any other way. Further, the example laser ranging unit 210, the example thrust ramping manager 204, the example data store 206, the example alarm controller 208, the example signal processor 210, the example airflow velocity determiner 212, the example airspeed determiner 214, the example crosswind determiner 216, the example thrust limit determiner 218, the example comparator 220 and/or, more generally, the example thrust ramping controller 134 of FIG. 2 may be implemented by hardware, software, firmware and/or any combination of hardware, software and/or firmware. Thus, for example, any of the example laser ranging unit 210, the example thrust ramping manager 204, the example data store 206, the example alarm controller 208, the example signal processor 210, the example airflow velocity determiner 212, the example airspeed determiner 214, the example crosswind determiner 216, the example thrust limit determiner 218, the example comparator 220 and/or, more generally, the example thrust ramping controller 134 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example laser ranging unit 210, the example thrust ramping manager 204, the example data store 206, the example alarm controller 208, the example signal processor 210, the example airflow velocity determiner 212, the example airspeed determiner 214, the example crosswind determiner 216, the example thrust limit determiner 218, the example comparator 220 is/are hereby expressly defined to include a tangible computer readable storage device or storage disk such as a memory, a digital versatile disk (DVD), a compact disk (CD), a Blu-ray disk, etc. storing the software and/or firmware. Further still, the example thrust ramping controller 134 of FIG. 1 may include one or more elements, processes and/or devices in addition to, or instead of, those illustrated in FIG. 2, and/or may include more than one of any or all of the illustrated elements, processes and devices.

Figure 3A:
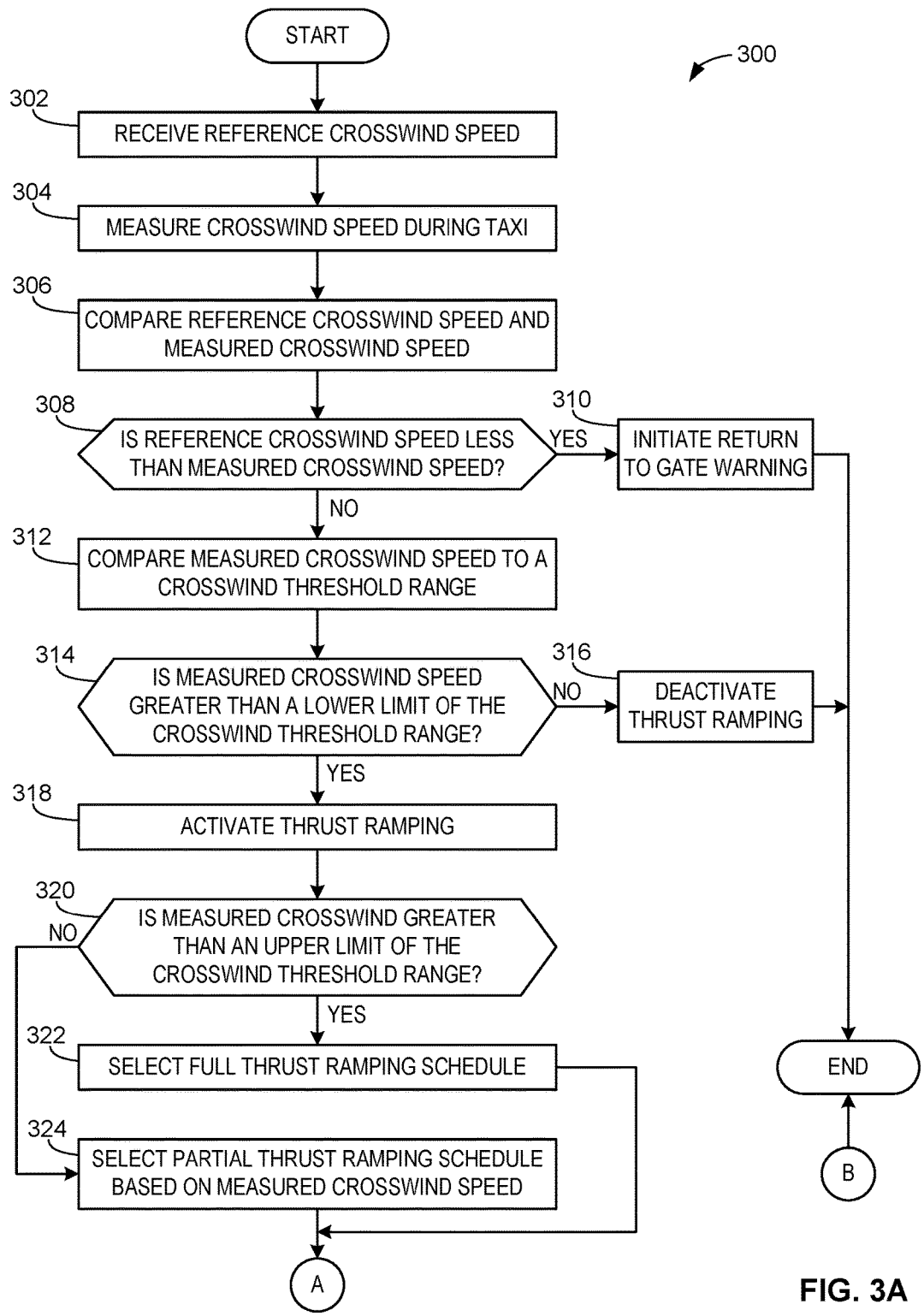
FIGS. 3A and 3B are flowcharts representative of example methods that may be performed to implement the example thrust ramping controller of FIGS. 1 and 2.
Figure 3B:
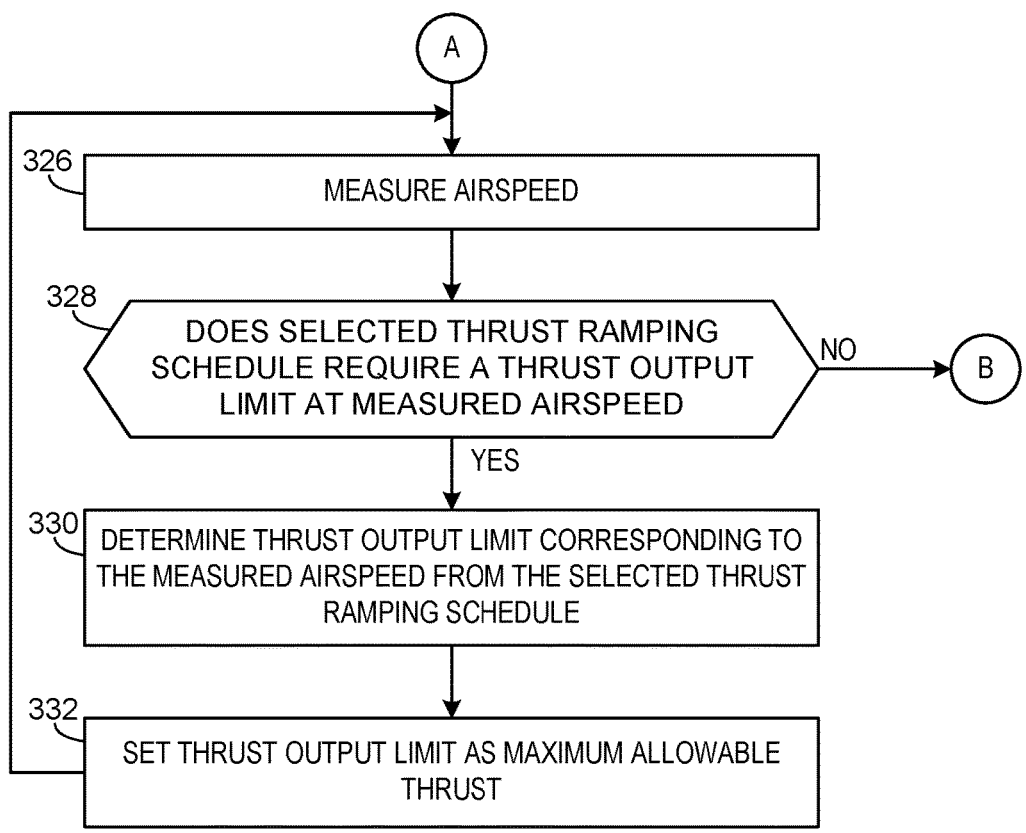

A flowchart representative of an example method 300 for implementing the thrust ramping controller 134 of FIGS. 1 and 2 is shown in FIGS. 3A and 3B. In this example, the methods may be implemented using machine readable instructions that comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIGS. 3A and 3B, many other methods of implementing the example thrust ramping controller 134 may alternatively be used. For example, the order of execution of the blocks may be changed, and/or some of the blocks described may be changed, eliminated, or combined.

As mentioned above, the example process of FIGS. 3A and 3B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3A and 3B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The method 300 of FIGS. 3A and 3B begins at block 302 when the thrust ramping manager 204 receives the reference crosswind speed (block 302). For example, the thrust ramping manager 204 of the illustrated example receives the reference crosswind speed from the input/output interface 138 of the cockpit 115. In some examples, the pilot receives the reference crosswind speed (e.g., 15 knots) from a traffic control tower. The thrust ramping manager 204 may store the reference crosswind speed in the data store 206. The pilot may load the aircraft 100 based on runway length and engine thrust availability due to the reference crosswind speed provided by the tower. In some examples, the pilot may add a crosswind buffer value (e.g., of 5 knots) to the reference crosswind speed.

The thrust ramping controller 134 measures a crosswind speed (block 304). For example, the thrust ramping system 102 of the illustrated example measures the crosswind speed when the aircraft 100 is taxiing (e.g., stationary). The crosswind determiner 216 measures the crosswind speed based on an airflow velocity vector provided by the airflow velocity determiner 212 and communicates the measured crosswind speed to the thrust ramping manager 204.

Next, the thrust ramping manager 204 compares the reference crosswind speed and the measured crosswind speed (block 306). The thrust ramping manager 204 then determines if the reference crosswind speed is less than the measured crosswind speed (block 308). If the reference crosswind speed is less than the measured crosswind speed at block 308, the thrust ramping manager 204 causes the alarm controller 208 to initiate a return to gate warning (block 310). For example, the alarm controller 208 may initiate an alarm in the cockpit 115 via the input/output interface 138 (e.g., an audible alarm, a visual indicator, etc.). For example, during taxi, if the thrust ramping system 102 measures a crosswind speed of 18 knots that is greater than the reference crosswind speed of 15 knots, the pilot is alerted to return to the gate to decrease a payload.

If the reference crosswind speed is less than the measured crosswind speed at block 308, the thrust limit determiner 218 compares the measured crosswind speed to a crosswind threshold range (block 312). For example, the thrust limit determiner 218 may determine/retrieve the crosswind threshold range from the data store 206. For example, the crosswind threshold range may be between approximately 12 knots (e.g., a lower limit) and 25 knots (e.g., an upper limit).

The thrust limit determiner 218 determines if the measured crosswind speed is greater than a lower limit of the crosswind threshold range (block 314). If the thrust limit determiner 218 determines that the measured crosswind speed is not greater than the lower limit of the crosswind threshold range at block 414, the thrust limit determiner 218 deactivates thrust ramping (block 316). For example, if the measured crosswind speed is less than 12 knots, the thrust ramping manager 204 deactivates thrust ramping.

If the thrust limit determiner 218 determines that the measured crosswind speed is greater than the lower limit of the crosswind threshold range at block 414, the thrust limit determiner 218 activates thrust ramping (block 318). When thrust ramping is activated, the thrust limit determiner 218 determines if the measured crosswind speed is greater than an upper limit of the crosswind threshold range (block 320). If the crosswind speed is greater than the upper limit of the crosswind threshold range at block 320, the thrust ramping manager 204 selects or activates a full thrust ramping schedule (block 322). If the crosswind speed is not greater than the upper limit of the crosswind threshold range at block 320, the thrust ramping manager 204 selects or activates a partial thrust ramping schedule (block 324). For example, thrust ramping manager 204 selects a partial thrust ramping schedule associated with the measured crosswind speed.

The airspeed determiner 214 then measures the airspeed of the aircraft 100 (block 326). For example, the airspeed determiner 214 communicates the airspeed to the thrust ramping manager 204. The thrust limit determiner 218 determines if the selected thrust ramping schedule requires a thrust output limit at the measured airspeed (block 328). If the thrust limit determiner 218 determines that the selected thrust ramping schedule does not require a thrust output limit associated with the measured airspeed at block 328, the thrust ramping manager 204 deactivates the selected thrust ramping schedule and the process ends. In some such examples, when the thrust ramping is deactivated, the electronic engine controller 116 sets a thrust output of the first engine 110 and the second engine 112 as a thrust command input from thrust lever 114.

If the thrust limit determiner 218 determines that the selected thrust ramping schedule requires a thrust output limit at block 328, the thrust limit determiner 218 determines a thrust output limit that corresponds to the measured airspeed from the selected thrust ramping schedule (block 330). For example, the thrust limit determiner 218 retrieves a thrust output limit corresponding to the measured airspeed from a look-up table associated with the selected thrust ramping schedule. The thrust ramping manager 204 sets the thrust output limit as a maximum allowable thrust output of the first engine 110 and the second engine 112 (block 332). For example, the method 300 then returns to block 326 and continues to adjust a thrust output limit as the airspeed changes (e.g., increases) based on the selected thrust ramping schedule until the measured airspeed at block 328 does not require a thrust output limit. For example, a thrust output limit is not needed when the measured airspeed is such that the crosswind no longer impacts performance characteristics of the first engine 110 and the second engine 112.

Figure 4:
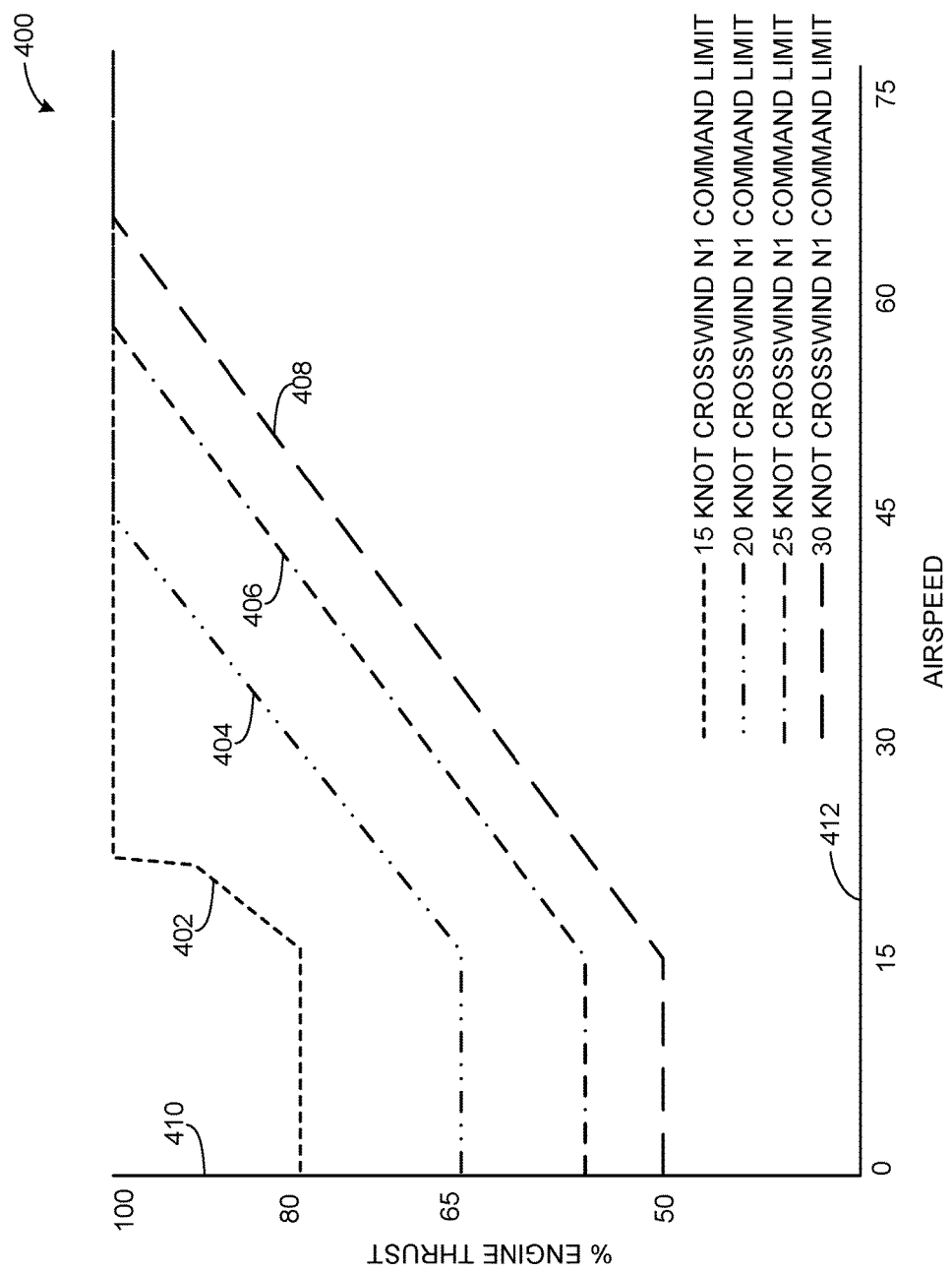
FIG. 4 is an example graph representative of thrust ramping schedules that may be employed by the example thrust ramping controller of FIGS. 1 and 2.

FIG. 4 is an example graph 400 representative of example thrust ramping schedules that may be used to implement the example thrust ramping controller 134 of FIGS. 1 and 2. For example, the graph 400 illustrates a first thrust ramping schedule 402 associated with a first crosswind speed (e.g., 15 knots), a second thrust ramping schedule 404 associated with a second crosswind speed (e.g., 20 knots), a third thrust ramping schedule 406 associated with a third crosswind speed (e.g., 25 knots), and a fourth thrust ramping schedule 408 associated with a fourth crosswind speed (e.g., 30 knots). For example, the first, second and third ramping schedules 402-406 of the illustrated example provide partial thrust ramping and the fourth thrust ramping schedule 408 of the illustrated example provides full thrust ramping.

The graph 400 of the illustrated example provides a thrust limit vs. airspeed graph for the various example thrust ramping schedules 402-408. In the illustrated example, the y-axis of the graph represents thrust output limit values 410 as a percentage of full available thrust and the x-axis represents airspeed 412 (e.g., a forward vector of the relative velocity of the aircraft 100). Thus, for each thrust ramping schedules 402-408, the thrust output limit 410 are provided as a function of the airspeed 412.

During operation, for example, the thrust limit determiner 218 of the illustrated example determines a thrust output limit 410 as a function of the measured airspeed 412 for a selected one of the thrust ramping schedules 402-408. For example, during operation, when the thrust ramping system 102 measures a crosswind speed of 15 knots when the aircraft 100 is stationary or taxiing, the thrust ramping manager 204 selects or activates the first thrust ramping schedule 402 (e.g., a partial thrust ramping schedule). The thrust limit determiner 218 receives the airspeed 412 from the airspeed determiner 214 and employs the graph 400 to determine a thrust output limit 410 associated with the selected thrust ramping schedules 402-408 based on the measured airspeed 412. Thus, when the first thrust ramping schedule 402 is selected and the measured airspeed 412 from the airspeed determiner 214 is between 0 knots and 15 knots, the thrust limit determiner 218 determines that the thrust output limit 410 is 80 percent engine thrust. As the airspeed 412 increases from 15 knots to approximately 20 knots, the thrust limit determiner 218 varies the thrust output limit 410 from 80 percent engine thrust to 100 percent engine thrust. Thus, the first thrust ramping schedule 402 of the illustrated example enables the first engine 110 and the second engine 112 to achieve full thrust when the airspeed 412 is approximately 20 knots.

On the contrary, the second thrust ramping schedule 404 limits thrust output to 65 percent engine thrust when the airspeed 412 is between approximately 0 knots and 15 knots and allows the first engine 110 and the second engine 112 to achieve 100 percent engine thrust when the airspeed 412 is approximately 45 knots. Thus, the second thrust ramping schedule 404 provides a more gradual thrust increase to 100 percent engine thrust than the first thrust ramping schedule 402. The example thrust ramping schedules 402-408 of the illustrated example may be configured for different types of aircraft engines and/or may differ based on performance characteristics of different engines.

Figure 5:
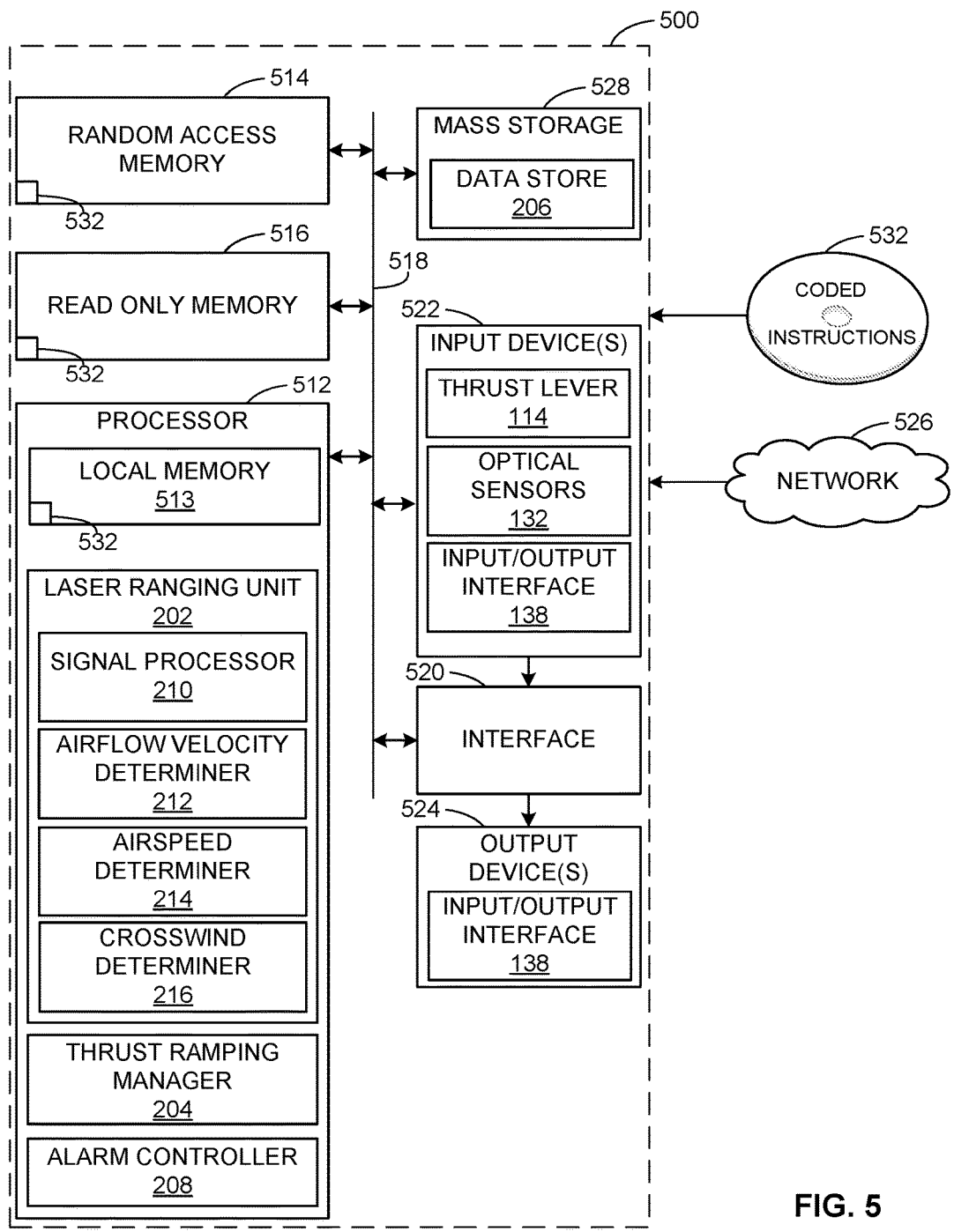
FIG. 5 is a block diagram of an example processor platform capable of executing instructions to implement the methods of FIGS. 3A and 3B and the example thrust ramping controller of FIGS. 1 and 2.

FIG. 5 is a block diagram of an example processor platform capable of executing instructions to implement the method 300 of FIGS. 3A and 3B and the example thrust ramping controller 134 of FIGS. 1 and 2. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

Coded instructions 532 to implement the methods of FIGS. 3A and 3B may be stored in the mass storage device 528, in the volatile memory 514, in the non-volatile memory 516, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A thrust control system for use with aircraft comprising:
 a sensor to measure a crosswind speed; and
 a thrust manager to compare a vector of the measured crosswind speed to a crosswind threshold range, the thrust manager to activate a partial thrust ramping schedule during takeoff when the measured crosswind speed is within the crosswind threshold range, the partial thrust ramping schedule being selected from a plurality of thrust ramping schedules.

2. The system of claim 1, further including a data input device to receive a reference crosswind speed.

3. The system of claim 2, wherein the thrust manager compares the reference crosswind speed and the measured crosswind speed.

4. The system of claim 3, further including an alarm controller to initiate an alarm when the reference crosswind speed is less than the measured crosswind speed.

5. The system of claim 1, wherein the thrust manager is to activate a full thrust ramping schedule during takeoff when the measured crosswind speed is greater than an upper limit of the crosswind threshold range.

6. The system of claim 5, wherein the thrust controller is to deactivate thrust ramping when the measured crosswind speed is less than a lower limit of the crosswind threshold range.

7. The system of claim 1, wherein the vector is an orthogonal vector component of a measured airflow velocity.

8. The system of claim 7, wherein the orthogonal vector of the measured airflow velocity is measured when the aircraft is stationary.

9. A method for controlling thrust of an aircraft, the method comprising:
 measuring a crosswind vector when the aircraft is taxiing;
 comparing the measured crosswind vector to an crosswind threshold range; and
 activating a partial thrust ramping schedule during takeoff based on the measured crosswind vector when the measured crosswind vector is within the crosswind threshold range.

10. The method of claim 9, further including applying a full thrust ramping schedule during takeoff when the measured crosswind vector is greater than an upper limit of the crosswind threshold range.

11. The method of claim 10, further including deactivating thrust ramping during takeoff when the measured crosswind vector is less than a lower limit of the crosswind threshold range.

12. The method of claim 9, further including comparing a reference crosswind vector and the measured crosswind vector, and initiating an alarm when the reference crosswind vector is less than the measured crosswind vector.

13. The method of claim 9, wherein providing the partial thrust ramping schedule includes retrieving the partial thrust ramping schedule from a look-up table.

14. The method of claim 9, further including measuring an airspeed of the aircraft during takeoff, and varying a thrust output limit as a function of the measured airspeed.

15. The method of claim 14, further including decreasing the thrust output limit as the measured airspeed increases.

16. A tangible computer-readable medium comprising instructions that, when executed, cause a machine to:
   measure a crosswind vector;
   compare the measured crosswind vector to a crosswind threshold range; and
   activate a partial thrust ramping schedule during takeoff based on the measured crosswind vector when the measured crosswind vector is within the crosswind threshold range.

17. The computer-readable medium as defined in claim 16 further including instructions that, when executed, cause the machine to apply a full thrust ramping schedule during takeoff when the measured crosswind vector is greater than an upper limit of the crosswind threshold range.

18. The computer-readable medium as defined in claim 17 further including instructions that, when executed, cause the machine to deactivate thrust ramping during takeoff when the measured crosswind vector is less than a lower limit of the crosswind threshold range.

19. The computer-readable medium as defined in claim 16 further including instructions that, when executed, cause the machine to compare a reference crosswind vector and the measured crosswind vector, and initiate an alarm when the reference crosswind vector is less than the measured crosswind vector.

20. The computer-readable medium as defined in claim 16 further including instructions that, when executed, cause the machine to retrieve the partial thrust ramping schedule corresponding to the measured crosswind vector from a predetermined look-up table.

21. The computer-readable medium as defined in claim 16 further including instructions that, when executed, cause the machine to measure an airspeed of an aircraft during takeoff, and vary a thrust output limit as a function of the measured airspeed.

22. The computer-readable medium as defined in claim 21 further including instructions that, when executed, cause the machine to decrease the thrust output limit as the measured airspeed increases.

* * * * *